United States Patent [19]
Ishikawa et al.

[11] Patent Number: 5,140,546
[45] Date of Patent: Aug. 18, 1992

[54] ADDER CIRCUIT APPARATUS

[75] Inventors: Kazuyuki Ishikawa; Yukihiko Shimazu; Toshiki Fujiyama, all of Itami, Japan

[73] Assignee: Mitsubishi Denki Kabushiki Kaisha, Tokyo, Japan

[21] Appl. No.: 531,713

[22] Filed: May 31, 1990

[30] Foreign Application Priority Data

Jun. 30, 1989 [JP] Japan ................................ 1-170267

[51] Int. Cl.⁵ .............................................. G06F 2/50
[52] U.S. Cl. .................................................. 364/787
[58] Field of Search ........................................ 364/787

[56] References Cited
U.S. PATENT DOCUMENTS

| | | | |
|---|---|---|---|
| 4,817,031 | 3/1989 | Tokumaru | 364/787 |
| 4,827,444 | 5/1989 | Akiyama et al. | 364/787 |
| 4,899,305 | 2/1990 | Needles | 364/787 |
| 4,905,180 | 2/1990 | Kumar | 364/787 |

OTHER PUBLICATIONS

*Principles of CMOS VLSI Design*; Weste, et al., pp. 324-325, Addison-Wesley, 1985.

Primary Examiner—David H. Malzahn
Attorney, Agent, or Firm—Townsend and Townsend

[57] ABSTRACT

An adder circuit includes a Manchester-carry-chain circuit which propagates a carry signal for each block consisting of plural bits, and a carry-look-ahead circuit which selects said carry signal in response to a carry propagation signal being generated by a full adder, and when the carry signal is not generated in the two consecutive blocks, an output from the Manchester-carry-chain circuit is selected by the carry-look-ahead circuit, so that the carry signal being inputted to the low-order block of the two blocks can be propagated as the carry signal to be outputted from the high-order block.

8 Claims, 10 Drawing Sheets

ADDER CIRCUIT APPARATUS

BACKGROUND OF THE INVENTION

1. Field of the Invention

The present invention relates to an adder circuit apparatus in which serial plural-digit full adders are arranged in blocks, more particularly, it relates to an adder circuit apparatus including a Manchester-carry-chain circuit with a carry-look-ahead circuit as a carry signal propagation circuit.

2. Description of Related Art

Figure 1:
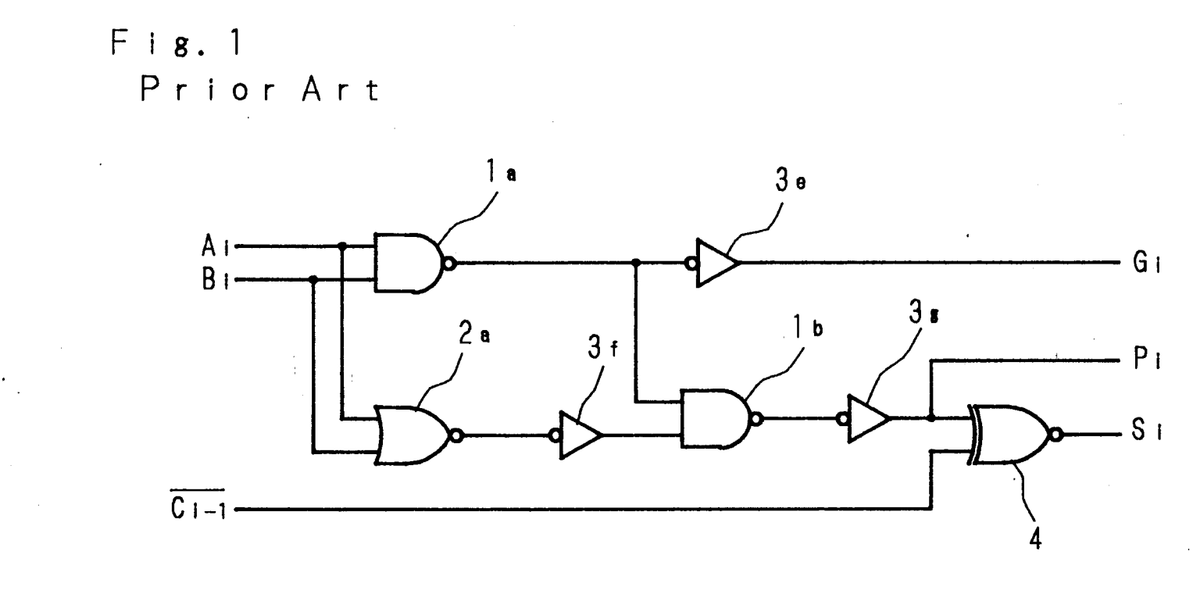
FIG. 1 is a circuit diagram showing the configuration of a conventional full adder.
Figure 2:
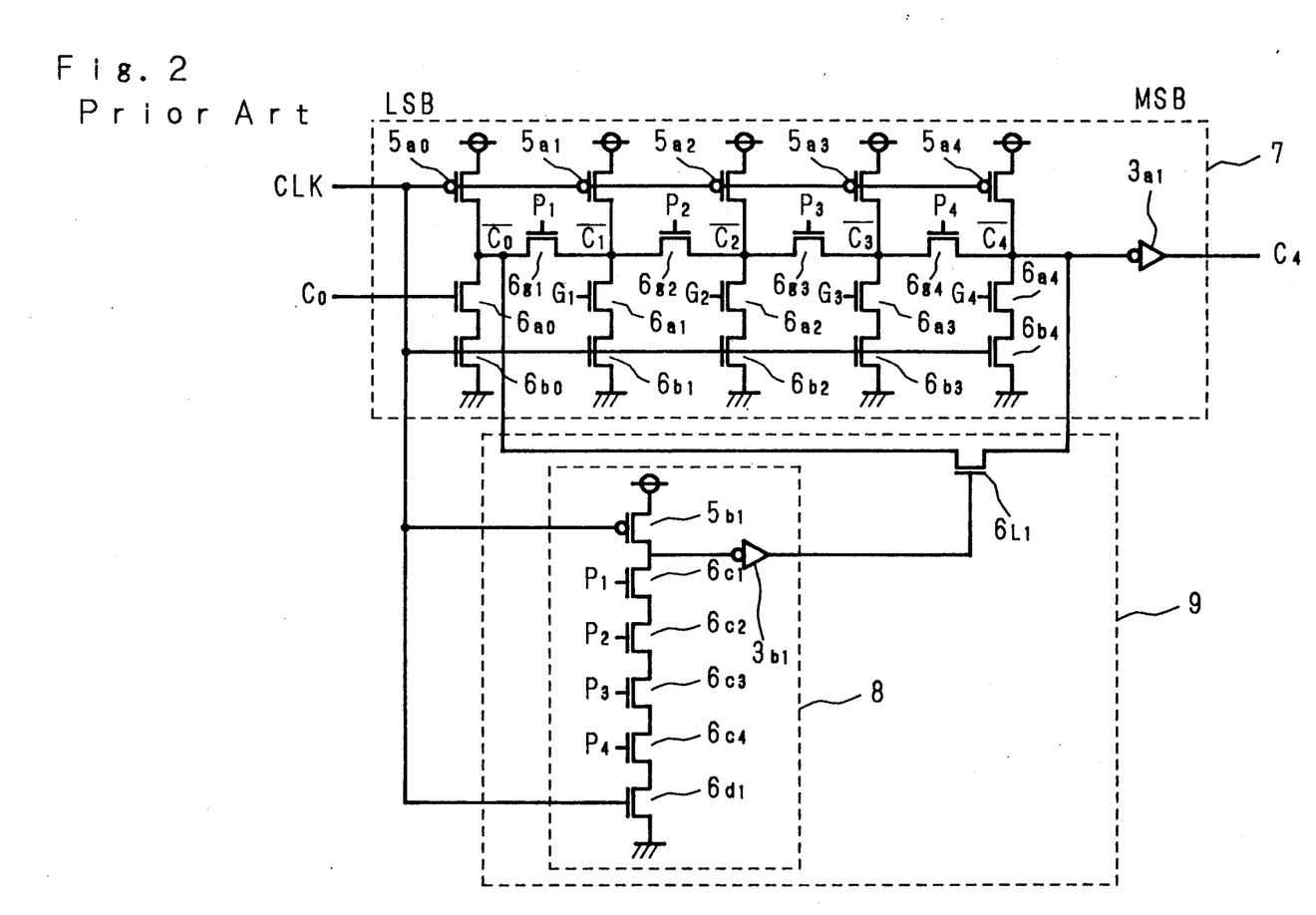
FIG. 2 is a circuit diagram showing the configuration of a conventional adder circuit apparatus.

A conventional full adder and a Manchester-carry-chain circuit are described, for example, on pages 324, 325, in "PRINCIPLES OF CMOS VLSI DESIGN" by Neil H. E. Weste and Kamran Eshraghian, published by Addison-Wesley Publishing Corp. FIGS. 1 and 2 illustrate circuit diagrams showing the configuration of the prior art full adder and Manchester-carry-chain circuit described in the aforesaid book. In FIG. 1, an i th bit addend input signal $A_i$ and an augend input signal $B_i$ are given to a NAND circuit $1_a$ and an NOR circuit $2_a$ respectively. An output signal of the NAND circuit $1_a$ is given to one end of a NAND circuit $1_b$ and is outputted as a carry generation signal $G_i$ via an inverter $3_e$. An output signal of the NOR circuit $2_a$ is given to the other end of the NAND circuit $1_b$ via an inverter $3_f$. An output signal of the NAND circuit $1_b$ is outputted as a carry propagation signal $P_i$ via an inverter $3_g$ and is given to one end of an exclusive (hereinafter referred to as Ex) NOR circuit 4. An i−1 th bit inversion carry output signal (hereinafter referred to as a carry signal) $\overline{C_{i-1}}$ is given to the other end of the ExNOR circuit 4, of which output signal is outputted as an i th bit sum output signal $S_i$.

In FIG. 2, numeral 7 indicates a 4-bit Manchester-carry-chain circuit, which comprises five P channel transistor (hereinafter referred to as PchTR) $5_{a0}, 5_{a1} \ldots 5_{a4}$ whose sources are connected to a power supply, five N channel transistors (hereinafter referred to as NchTR) $6_{a0}, 6_{a1} \ldots 6_{a4}$ whose drains are connected to each drain of said PchTRs $5_{a0}, 5_{a1} \ldots$, five NchTRs $6_{b0}, 6_{b1} \ldots 6_{b4}$ whose drains are connected to the sources of said NchTRs $6_{a0}, 6_{a1} \ldots 6_{a4}$ respectively and whose sources are earthed, four NchTRs $6_{g1}, 6_{g2}, 6_{g3}, 6_{g4}$ whose sources are connected to intermediate nodes between the PchTRs $5_{a0} \sim 5_{a3}$ and the NchTRs $6_{a0} \sim 6_{a3}$, and whose drains are connected to intermediate nodes between the PchTRs $5_{a1} \sim 5_{a4}$ and the NchTRs $6_{a1} \sim 6_{a4}$ and an inverter $3_{a1}$ which outputs a 4-bit carry signal $C_4$. There are given a clock signal CLK to the gates of the PchTRs $5_{a0}, 5_{a1} \ldots$ and NchTRs $6_{b0}, 6_{b1} \ldots$, a first carry signal $C_0$ to the gate of the NchTR $6_{a0}$, and carry generation signals $G_1, G_2 \ldots$ for each bit to the gates of the NchTRs $6_{a1}, 6_{a2} \ldots$, respectively. Carry propagation signals $P_1, P_2 \ldots$ for each bit are given to the gates of the NchTRs $6_{g1}, 6_{g2} \ldots$. The intermediate node between the PchTR $5_{a0}$ and NchTR $6_{a0}$ and that between the PchTR $5_{a4}$ and NchTR $6_{a4}$ are connected via an NchTR $6_{L1}$.

Numeral 9 denotes a carry-look-ahead circuit, which comprises, a clocked AND circuit 8 provided in every block each consisting of 4 bits, and in which a PchTR $5_{b1}$ and the NchTRs $6_{c1}, 6_{c2}, 6_{c3}, 6_{c4}$ connected to a power supply at their sources and an NchTR $6_{d1}$ earthed at its source are connected in series, and an inverter $3_{b1}$ is connected to an intermediate node between the PchTR $5_{b1}$ and NchTR $6_{c1}$, and the aforesaid NchTR $6_{L1}$. Output of the inverter $3_{b1}$ is given to a gate of the NchTR $6_{L1}$, so is the clock signal CLK to a gate of the NchTR $6_{d1}$. To gates of the NchTRs $6_{c1}, 6_{c2}, 6_{c3}, 6_{c4}$, carry propagation signals $P_1, P_2, P_3, P_4$ for each bit are given separately.

In the following, the operation of the conventional adder circuit thus constructed will be described. Table 1 below shows a truth table of the full adder shown in FIG. 1.

TABLE 1

| $A_i$ | $B_i$ | $G_i$ | $P_i$ | $\overline{C_{i-1}}$ | $S_i$ |
|---|---|---|---|---|---|
| 0 | 0 | 0 | 0 | 0 | 1 |
|   |   |   |   | 1 | 0 |
| 0 | 1 | 0 | 1 | 0 | 0 |
|   |   |   |   | 1 | 1 |
| 1 | 0 | 0 | 1 | 0 | 0 |
|   |   |   |   | 1 | 1 |
| 1 | 1 | 1 | 0 | 0 | 1 |
|   |   |   |   | 1 | 0 |

As it will be apparent from the Table 1, a carry generation signal $G_i$ becomes "1" when both the addend input signal $A_i$ and the augend input signal $B_i$ are "1". Also, a carry propagation signal $P_i$ becomes "1" when the addend input signal $A_i$ and the augend input signal $B_i$ show the different values.

Meanwhile, in FIG. 2, because the PchTRs $5_{a0} \sim 5_{a4}$ and $5_{b1}$ are ON and the NchTRs $6_{b0} \sim 6_{b4}$ and $6_{d1}$ are OFF when the clock signal CLK is "0", the inversion carry signal $\overline{C_i}$ of each bit becomes "1" respectively by a power supply voltage.

When the clock signal CLK becomes "1" and the carry generation signal $G_i$ is "1", the inversion carry signal $\overline{C_i}$ becomes "0" and the carry signal $C_i$ is generated. At that time, if the carry propagation signal $P_i$ is "1", the NchTR $6_{gi}$ to which the carry propagation signal $P_i$ is inputted is turned on, and the (i−1)th bit inversion carry signal $\overline{C_{i-1}}$ is propagated as the i th bit inversion carry signal $\overline{C_i}$. This inversion carry signal $\overline{C_i}$ is added to the addend input signal $A_{i+1}$ and the augend input signal $B_{i+1}$ in the full adder of the (i+1)th bit, thereby a sum output signal $S_{i+1}$ is obtained.

While, when the clock signal CLK becomes "1" and all of the carry propagation signal $P_i$ are "1", the output signal from the inverter $3_{b1}$ in the clocked AND circuit 8 of the carry-look-ahead circuit 9 becomes "1" and the NchTR $6_{L1}$ is turned on, thereby the first inversion carry signal $\overline{C_0}$ of the Manchester-carry-chain circuit 7 is propagated directly as the 4th bit inversion carry signal $\overline{C_4}$.

A maximum delay path with the longest propagation time of carry signal of the circuit shown in FIG. 2 will now be considered.

Firstly, when the carry signal $C_0$ and the carry propagation signals $P_1 \sim P_4$ are "1", though the first inversion carry signal $\overline{C_0}$ is propagated as the inversion carry signal $\overline{C_4}$ via the 4-step NchTRs $6_{g1} \sim 6_{g4}$, at this time the NchTR $6_{L1}$ is turned on by the carry-look-ahead circuit 9, allowing it to propagate also via the 1-step NchTR $6_{L1}$, then, this will not be the maximum delay path.

When the carry generation signal $G_1$ and the carry propagation signals $P_2 \sim P_4$ are "1", however, since the inversion carry signal $\overline{C_1}$ is propagated via the 3-step NchTRs $6_{g2} \sim 6_{g4}$, this will be the maximum delay path of the Manchester-carry-chain circuit 7.

Next will be described a maximum delay path of the carry signal when the adder circuits are aligned in plural steps as shown in FIG. 2.

Figure 3:
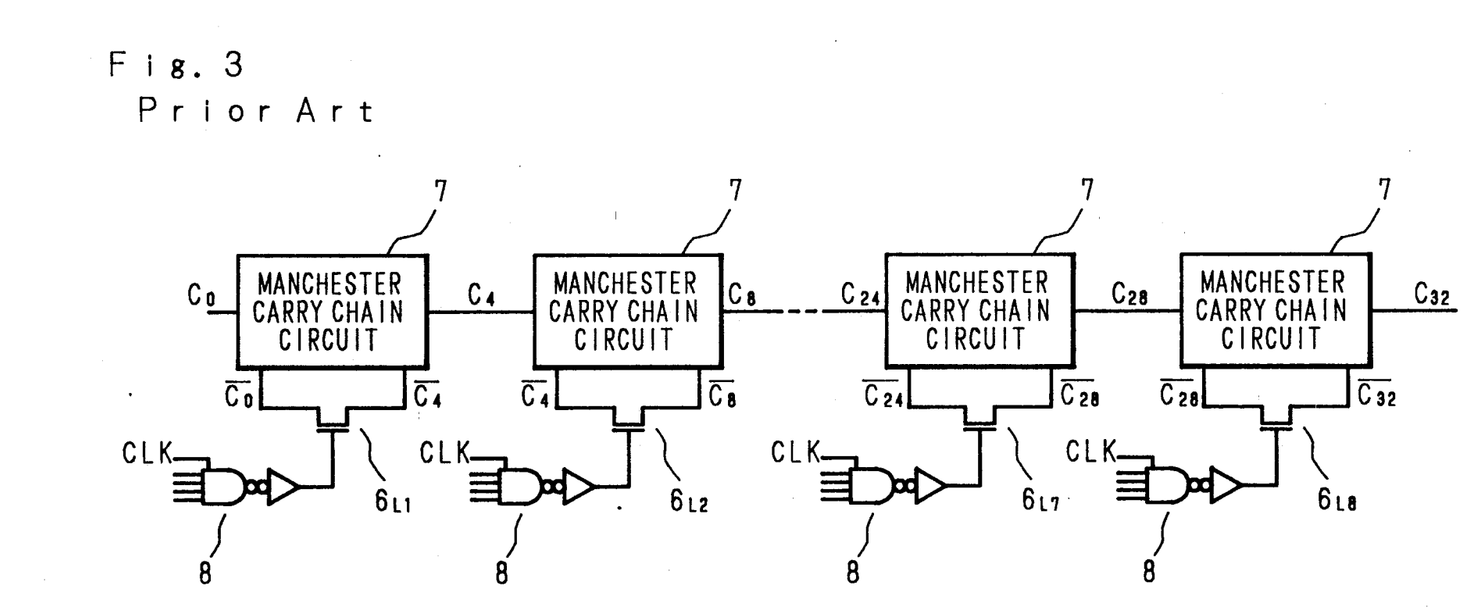
FIG. 3 is a circuit diagram showing the configuration of a conventional 32-bit adder circuit.

FIG. 3 is a circuit diagram showing the configuration of a conventional 32-bit adder circuit, in which eight 4-bit Manchester-carry-chain circuits shown in FIG. 2 are connected in series. Here j indicates a block, $6_{Lj}$ denotes an NchTR in the j th block carry-look-ahead circuit 9 from the low-order, $C_i$ designates an i th bit carry signal, so does $\overline{C_i}$ an i th bit inversion carry signal.

When the carry signal generated in the low-order is propagated as the top-order carry signal, the number of NchTRs interposed therebetween increases to become a maximum delay path.

The maximum delay path in the adder circuit constructed as shown in FIG. 3 is attained by propagating the carry signal $C_1$ generated in the first bit as the 32nd bit carry signal $C_{32}$. That is, it is the case when the carry generation signal $G_1$ and the carry propagation signals $P_2 \sim P_{22}$ are "1". In this case, the inversion carry signal $\overline{C_1}$ is propagated as the carry signal $C_4$ via the 3-step NchTRs $6_{g2} \sim 6_{G4}$ and a 1-step inverter $3_a$, and then is propagated as the carry signal $C_{32}$ via the 7-step NchTRs $6_{L2} \sim 6_{L8}$ and 14-step inverters $3_a, 3_b \ldots$ of the carry-look-ahead circuits 9, 9 ... present at intervals of four bits. Thus, when the maximum delay path is passed, the carry signal $C_1$ is propagated via the total of 10-step NchTRs and 15-step inverters.

In such a prior art adder circuit as described above, when a low-order digit carry signal is propagated directly to the high-order digit, it has to pass all of the carry-look-ahead circuit gates in the higher order than the propagation starting digit, thus, the propagation time of the carry signal is considerably delayed to hinder the high-speed operation.

SUMMARY OF THE INVENTION

The present invention has been devised in view of such circumstances, and, it is a primary object thereof to provide an adder circuit apparatus in which when a low-order digit carry signal is propagated directly to the high-order digit, carry-look-ahead circuit gates located in the higher order than the propagation starting digit are passed alternately to reduce the number of gate steps to be passed on the propagation path of the carry signal, and to shorten the propagation time delay thereof for realizing the high-speed operation.

In order to accomplish the object, in the adder circuit apparatus according to the present invention, operating means for executing the AND operation of a carry propagation signal in a block is provided, and a carry signal generated by carry signal propagating means in the block is outputted as a carry output signal when the operation result is false, and a carry input signal inputted to the carry signal propagating means in the block is outputted as a carry output signal of the block when the operation result is true, and a carry input signal to a low-order block is outputted as the carry output signal of the block when the operating means is true and the operation result of operating means of the adjoining block in the low-order is true.

As a result, when the operation result of the operating means is true for two consecutive blocks, a carry input signal to the low-order block is outputted as a carry output signal of the high-order block, and the carry signal is propagated via the block gate alternately, then, the number of gates to be passed at propagation is reduced.

The above and further objects and features of the invention will more fully be apparent from the following detailed description with accompanying drawings.

DESCRIPTION OF THE PREFERRED EMBODIMENTS

Figure 4:
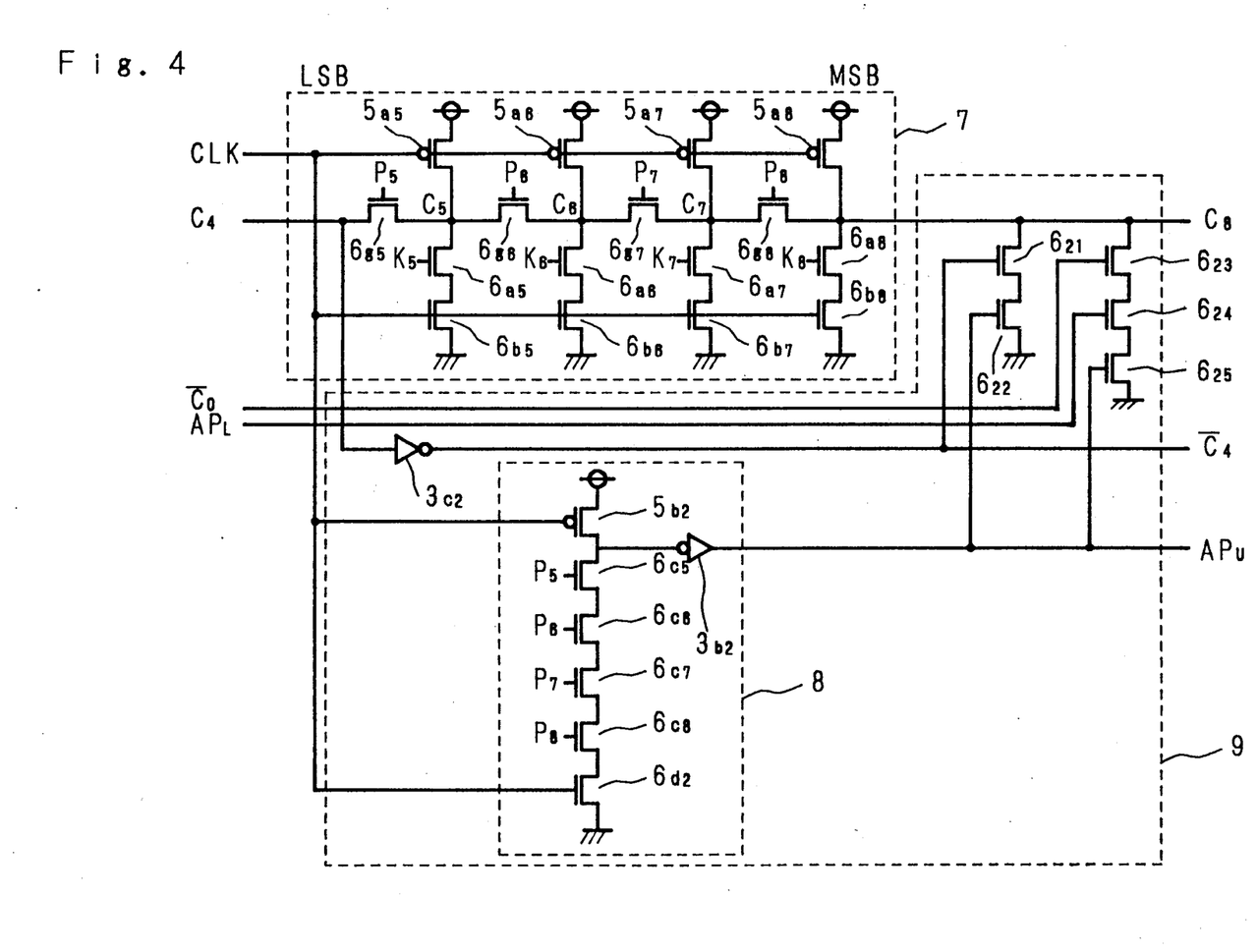
FIG. 4 is a circuit diagram showing the configuration of an adder circuit according to the present invention.
Figure 5:
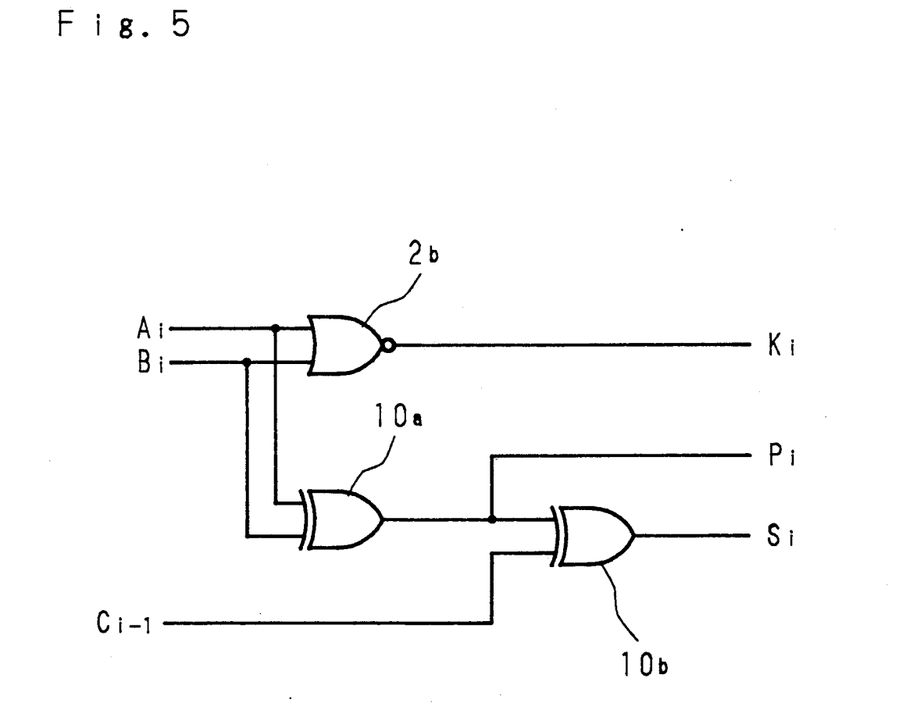
FIG. 5 is a circuit diagram showing the configuration of a full adder employed therein.

In the following, embodiments of the present invention will be described with reference to the drawings. FIG. 4 is a circuit diagram showing the configuration of an adder circuit apparatus according to the present invention, and FIG. 5 is a circuit diagram showing the configuration of a full adder used therein. In FIG. 5, an addend input signal $A_i$ and an augend input signal $B_i$ are given to a NOR circuit $2_b$ as well as to an ExOR circuit $10_a$. An output signal of the NOR circuit $2_b$ is outputted as a carry delete signal $K_i$, and an output signal of the ExOR circuit $10_a$ is outputted as a carry propagation signal $P_i$ as well as to one end of the ExOR circuit $10_b$. To the other end of the ExOR circuit $10_b$, a carry signal $\overline{C_{i-1}}$ which is a 1-bit low-order carry output signal is given, and this output signal is outputted as a sum output signal $S_i$.

In FIG. 4, numeral 7 indicates a 4-bit precharge-type Manchester-carry-chain circuit in a second block of 5th to 8th bit, said Manchester-carry-chain circuit 7 comprising four PchTRs $5_{a5}, 5_{a6} \ldots 5_{a8}$ whose sources are connected to a power supply, four NchTRs $6_{a5}, 6_{a6} \ldots 6_{a8}$ whose drains are connected to the respective drains of the PchTRs $5_{a5}, 5_{a6} \ldots$, four NchTRs $6_{b5}, 6_{b6} \ldots 6_{b8}$ whose drains are connected to the sources of the NchTRs $6_{a5}, 6_{a6}$ separately and whose sources are earthed, and four NchTRs $6_{g5}, 6_{g6} \ldots 6_{g8}$ connected in series and provided with one-bit low-order carry signal $C_4$ in its source at the LSB side. Drains of NchTR $6_{gi}$ and PchTR $5_{ai}$ of each bit i are connected. To the gates of the PchTRs $5_{a5} \sim 5_{a8}$ and NchTRs $6_{b5} \sim 6_{b8}$, a clock signal CLK is given, and carry propagation signals $P_5 \sim P_8$ for each bit are given separately to the gates of the NchTRs $6_{g5} \sim 6_{g8}$.

Carry signals $C_4 \sim C_7$ are propagated as a carry signal $C_8$ when the carry propagation signals $P_5 \sim P_8$ are "1". To the gates of the NchTRs $6_{a5} \sim 6_{a8}$, carry delete signals $K_5 \sim K_8$ which are the associated carry signal of each bit are given, and when the signals $K_5 \sim K_8$ are "1", the carry signals $C_5 \sim C_8$ become "0" and are deleted.

Numeral 9 denotes a carry-look-ahead circuit, which comprises a clocked AND circuit 8 consisting of a PchTR $5_{b2}$ and five NchTRs $6_{c5} \sim 6_{c8}$, $6_{d2}$ connected in series and whose one end is connected to a power supply and whose other end is earthed, and an inverter $3_{b2}$ connected to an intermediate node between the PchTR $5_{b2}$ and the NchTR $6_{c5}$, an inverter $3_{c2}$ for inversing a 1-bit low-order carry signal $C_4$ and transmitting it to a high-order block, and five NchTRs $6_{21} \sim 6_{25}$. To the gates of the PchTR $5_{b2}$ and NchTR $6_{d2}$ in the clocked AND circuit 8, the clock signal CLK is given, and to the gates of four NchTRs $6_{c5} \sim 6_{c8}$, carry propagation signals $P_5 \sim P_8$ of each bit are given separately.

The NchTR $6_{21}$ and NchTR $6_{22}$ are connected in series, and a drain of the NchTR $6_{21}$ is connected to an intermediate node between the PchTR $5_{a8}$ and NchTR $6_{a8}$, and a source of the NchTR $6_{22}$ is earthed. To a gate of the NchTR $6_{21}$, 1-bit low-order inversion carry signal $\overline{C_4}$ which is an output signal of the inverter $3_{c2}$ is given, and to a gate of the NchTR $6_{22}$, an output signal $AP_U$ of the clocked AND circuit 8 which is an output of the inverter $3_{b2}$ is given.

The NchTRs $6_{23}$, $6_{24}$, $6_{25}$ are connected in series, and a drain of the NchTR $6_{23}$ is connected to a drain of the NchTR $6_{21}$, and a source of the NchTR $6_{25}$ is earthed. There are given to a gate of the NchTR $6_{23}$, an inversion carry signal $\overline{C_0}$ which is a one-block low-order (1st to 4th bit) inversion carry input signal of the Manchester-carry-chain circuit 7 aligned in every block consisting of 4 bits, an output signal $AP_L$ of the one-block low-order clocked AND circuit 8 to a gate of the NchTR $6_{24}$, and the output signal $AP_U$ of the clocked AND circuit 8 of the block to a gate of the NchTR $6_{25}$.

The operation of the full adder and the adder circuit apparatus constructed as aforementioned will be described below. Table 2 below shows a truth table of the full adder shown in FIG. 5.

TABLE 2

| $A_i$ | $B_i$ | $K_i$ | $P_i$ | $\overline{C_{i-1}}$ | $S_i$ |
|---|---|---|---|---|---|
| 0 | 0 | 1 | 0 | 0 | 0 |
|   |   |   |   | 1 | 1 |
| 0 | 1 | 0 | 1 | 0 | 1 |
|   |   |   |   | 1 | 0 |
| 1 | 0 | 0 | 1 | 0 | 1 |
|   |   |   |   | 1 | 0 |
| 1 | 1 | 0 | 0 | 0 | 0 |
|   |   |   |   | 1 | 1 |

As it will be apparent from the above Table 2, a carry delete signal $K_i$ becomes "1" when both of the addend input signal $A_i$ and the augend input signal $B_i$ are "0". Also, a carry propagation signal $P_i$ becomes "1" when the addend input signal $A_i$ and the augend input signal $B_i$ show the different values.

In FIG. 4, when the clock signal CLK is "0", the PchTRs $5_{a5} \sim 5_{a8}$ and PchTR $5_{b2}$ are turned on, and the carry signal $C_i$ as the carry output signal of each bit is precharged by a power supply voltage and becomes "1" respectively.

Next, when the clock signal CLK becomes "1" and the carry delete signal $K_i$ is "1", an NchTR $6_{ai}$ whose gate receives the carry delete signal $K_i$ is turned on and the charged carry signal $C_i$ is discharged, becoming "0" and deleted. In this case, when the i th bit carry propagation signal $P_i$ is "1", that is, in the third condition, the NchTR $6_{gi}$ whose gate receives the carry propagation signal $P_i$ is turned on, and the (i−1)th bit carry signal $C_{i-1}$ is propagated as the i th bit carry signal $C_i$. The carry signal $C_i$, in the (i+1)th bit full adder, is added with an addend input signal $A_{i+1}$ and an augend input signal $B_{i+1}$, thereby a sum output signal $S_{i+1}$ is obtained.

And when the clock signal CLK becomes "1" and all of the carry propagation signals $P_5 \sim P_8$ are "1", that is, in the first condition, the output signal $AP_U$ of the clocked AND circuit 8 in the carry-look-ahead circuit 9 becomes "1" and the NchTR $6_{22}$ is turned on. At that time, if the carry signal $C_4$ is "0", the inversion carry signal $\overline{C_4}$ becomes "1" and the NchTR $6_{21}$ is turned on. The carry signal $C_8$ as a carry output signal is discharged and becomes "0". Also, at that time, if the carry signal $C_4$ is "1", the NchTR $6_{21}$ remains to be OFF and the carry signal $C_8$ is not discharged and remains to be "1". Accordingly, in the first condition, a potential of the carry signal $C_8$ becomes equal to that of the carry signal $C_4$, which is propagated directly as the carry signal $C_8$.

Now, viewing the case of the second condition where all of the carry propagation signals $P_5 \sim P_8$ of the high-order adder circuit and the carry propagation signals $P_1 \sim P_4$ of the low-order adder circuit are coincided with "1" in the configuration wherein adder circuit apparatus are aligned in two steps as shown in FIG. 4, that is, the case where all of the carry propagation signals are "1" for the serial 8-bit full adders, in this case, an AND signal of the low-order 4-bit carry propagation signals $P_1 \sim P_4$ corresponds to the output signal $AP_L$ in the high-order adder circuit, which signal becomes "1" (=truth). Since the output signal $AP_U$ which is an "and" of the high-order 4-bit carry propagation signals $P_5 \sim P_8$ also becomes "1" (=truth), both of the NchTR $6_{24}$ and the NchTR $6_{25}$ are turned on. In this case, when the carry signal $C_0$ is "0", since the inversion carry signal $\overline{C_0}$ becomes "1" and the NchTR $6_{23}$ is turned on and all of the three NchTRs $6_{23} \sim 6_{25}$ are turned on, the carry signal $C_8$ is discharged and becomes "0". When the carry signal $C_0$ is "1", the NchTR $6_{23}$ remains to be off and the carry signal $C_8$ is not discharged and remains to be "1". Accordingly, a potential of the carry signal $C_8$ becomes equal to that of the carry signal $C_0$, and the first carry signal $C_0$ is directly propagated as the carry signal $C_8$. At that time, the first condition aforementioned is met in the low-order block, then, the carry signal $C_4$ shows the same potential as the carry signal $C_0$.

Figure 6:
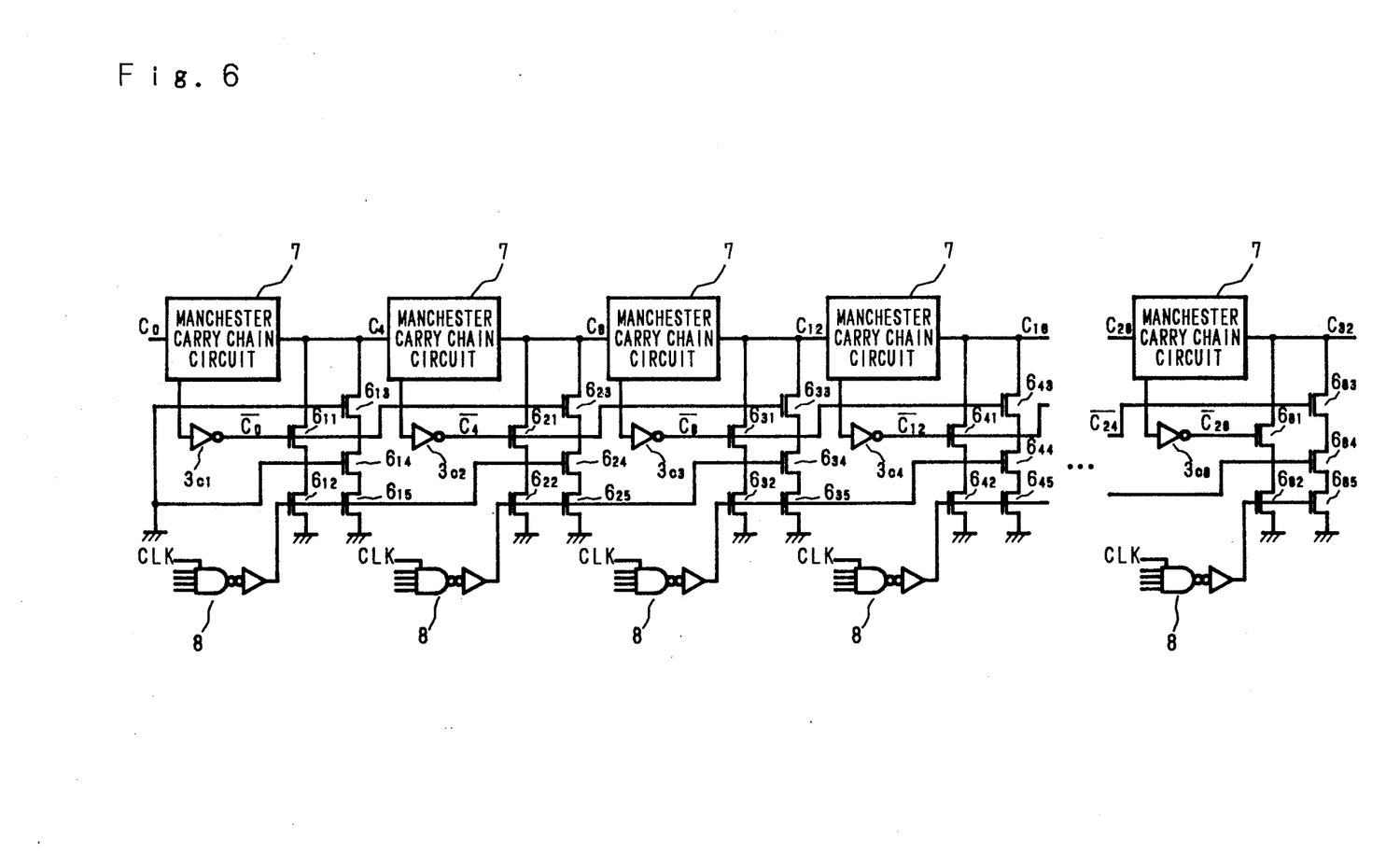
FIG. 6 is a circuit diagram showing the configuration of a 32-bit adder circuit apparatus.

Now will be described below a maximum delay path of the carry signal when the adder circuit apparatus are aligned in plural steps as shown in FIG. 4. FIG. 6 is a circuit diagram showing the configuration of a 32-bit adder circuit apparatus of the present invention, in which eight 4-bit Manchester-carry-chain circuits shown in FIG. 4 are connected in series.

The maximum delay path in this case occurs when a carry signal generated in the lower order is propagated as the top-order carry signal. In the configuration shown in FIG. 6, the maximum delay path occurs when a carry signal $C_1$ generated in the first bit is propagated as a 32nd bit carry signal $C_{32}$. That is, it occurs when the carry delete signal $K_1$ is "0" and the carry propagation signals $P_2 \sim P_{32}$ are "1". In this case, the carry signal $C_1$ is propagated to the first block as the carry signal $C_4$ via the 3-step NchTRs $6_{g2} \sim 6_{g4}$, and then is directly propagated at every eight bits as the carry signal $C_{12}$, $C_{20}$, $C_{28}$ via the inverters $3_{c2}$, $3_{c4}$, $3_{c6}$, $3_{c8}$ and the NchTRs $6_{33}$, $6_{53}$, $6_{73}$, $6_{81}$ ($6_{53}$, $6_{73}$ are not shown) in the carry-look-ahead circuit 9, and is propagated as the top-order digit carrier signal $C_{32}$. As previously described, the carry signal $C_1$ is propagated via the 4-step NchTRs $6_{33}$, $6_{53}$, $6_{73}$, $6_{81}$ and the 4-step inverters $3_{c2}$, $3_{c4}$, $3_{c6}$, $3_{c8}$ in the carry-look-ahead circuit 9, then, it passes through both of the 7-step NchTRs including the 3-step NchTRs $6_{g2} \sim 6_{g4}$ in the first block and the 4-step inverters.

A modification of the embodiment will now be described.

Figure 7:
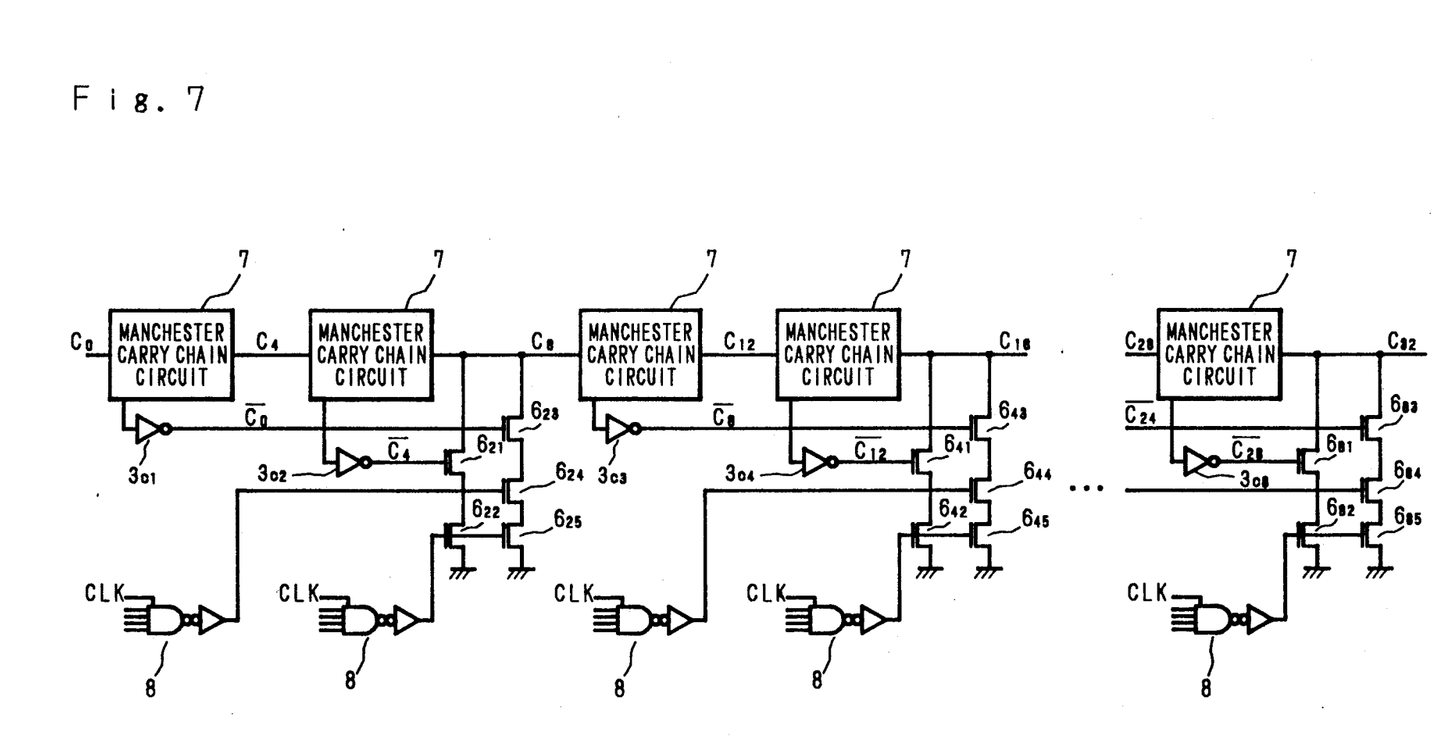
FIG. 7 is a circuit diagram showing the configuration of a modified 32-bit adder circuit apparatus.

FIG. 7 is a circuit diagram showing the configuration of a modified adder circuit, in which the carry-look-ahead circuit shown in FIG. 4 is provided in the Manchester-carry-chain circuits 7, 7 ... of even numbers of blocks (j=2, 4, 6, 8). Then, the carry-look-ahead circuit 9 of odd numbers of blocks (j=1, 3, 5, 7) consists of the clocked AND circuit 8 and the inverter $3_{cj}$, and the output signal $AP_U$ of the clocked AND circuit 8 in the odd numbers of blocks is given to the gate of the NchTR $6_{j4}$ in its high-order even numbers of blocks, so is the output of the inverter $3_{cj}$ to the gate of the NchTR $6_{j3}$ in its high-order even numbers of blocks, respectively.

The output signal $AP_U$ of the clocked AND circuit 8 of the even numbers of blocks is not outputted to the next block but given only to the gates of the NchTRs $6_{j2}$, $6_{j5}$, and an output signal $\overline{C_{4 \cdot (j-1)}}$ of the inverter $3_{cj}$ is given to the gate of the NchTR $6_{j1}$. A maximum delay path of the modified embodiment thus constructed will be described.

Also in this case, as same as in the case in FIG. 6, the maximum delay path occurs when the carry signal $C_1$ generated in the first bit is propagated as the 32nd bit carry signal $C_{32}$. And at that time, the carry signal $C_1$ is propagated as the carry signal $C_8$ via the 3-step NchTRs $6_{g2} \sim 6_{g4}$ and the inverter $3_{c2}$ and NchTR $6_{21}$ in the carry-look-ahead circuit 9, and then is directly propagated at every eight bits as the carry signals $C_{16}$, $C_{24}$, $C_{32}$ via the 3-step inverters $3_{c3}$ $3_{c5}$, $3_{c7}$ in the carry-look-ahead circuit 9 of the 3rd, 5th and 7th blocks, and the 3-step NchTRs $6_{43}$, $6_{63}$, $6_{83}$ of the 4th, 6th and 8th blocks. As previously described, the carry signal $C_1$ is propagated via the 4-step NchTRs $6_{21}$, $6_{43}$, $6_{63}$, $6_{83}$ and the 4-step inverters $3_{c2}$, $3_{c3}$, $3_{c5}$, $3_{c7}$ in the carry-look-ahead circuit 9. Then, when the maximum delay path is passed, it passes through the total of 7-step NchTRs and the 4-step inverters.

In the modified embodiment, the number of transistors being used is reduced and the cost is less expensive as compared with the embodiment shown in FIG. 4.

In the following, another embodiment of an adder circuit apparatus of the present invention will be described.

In the embodiment described heretofore, there has been described on the adder circuit comprising the carry-look-ahead circuit 9 including the clocked AND circuit 8, and the precharged-type Manchester-carry-chain circuit, however, in this embodiment, a static-type Manchester-carry-chain circuit and the carry-look-ahead circuit are employed. Accordingly, a clock is not necessary to be provided for control. Though the static-type Manchester-carry-chain circuit has a slower operating speed than that of the dynamic-type, it requires no precharging, which results in a low power consumption.

Figure 8:
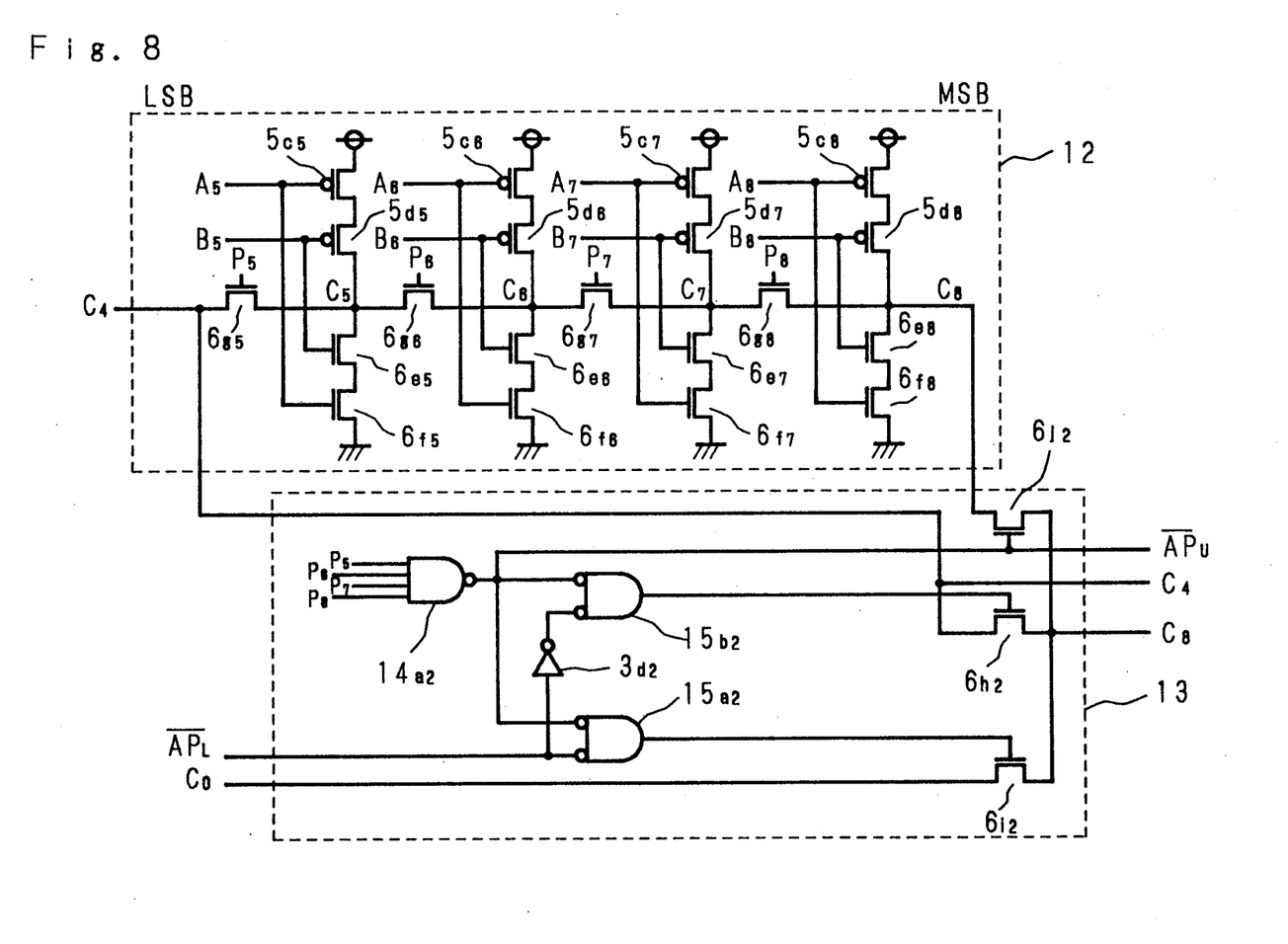
FIG. 8 is a circuit diagram showing the configuration of an adder circuit apparatus of another embodiment.

FIG. 8 is a circuit diagram showing the configuration of an adder circuit of another embodiment. In FIG. 8, numeral 12 indicates a 4-bit static-type Manchester-carry-chain circuit of the second block of 5th~8th bit. In the Manchester-carry-chain circuit 12 comprising four NchTRs $6_{g5} \sim 6_{g8}$ connected in series, the 1-bit low-order carry signal $C_4$ is given to the PchTRs $5_{ci}$, $5_{di}$, NchTRs $6_{ei}$, $6_{fi}$ of each bit (i=5~8) connected in series and a source at the LSB side. Sources of the PchTR $5_{ci}$ are connected to a power supply, sources of the NchTR $6_{fi}$ are earthed and drains of the NchTR $6_{gi}$ are connected to the intermediate nodes between the PchTR $5_{di}$ and NchTr $6_{ei}$.

To the gates of the PchTRs $5_{ci}$, $5_{di}$, the addend input signal $A_i$ and the augend input signal $B_i$ of each bit are given separately. And those signals $A_i$ and $B_i$ are also given to the NchTRs $6_{fi}$, $6_{ei}$, respectively.

Numeral 13 denotes the static-type carry-look-ahead circuit comprising, a NAND circuit $14_{a2}$ which is provided with 4-bit carry propagation signals $P_5 \sim P_8$ and executes the NAND operation, a NOR circuit $15_{a2}$ which is provided with an inversion output signal $\overline{AP_U}$ of the NAND circuit $14_{a2}$ and an inversion output signal $\overline{AP_L}$ of a 1-block low-order NAND circuit $14_{a1}$ and executes the NOR operation, a NOR circuit $15_{b2}$ which is provided with the inversion output signal $\overline{AP_U}$ and the output signal $AP_L$ given via an inverter $3_{d2}$ and executes the NOR operation, an NchTR $6_{l2}$ which propagates a carry signal $C_0$ being inputted to a 1-block low-order adder circuit, a NchTR $6_{h2}$ which propagates the carry signal $C_4$ outputted from the 1-block low-order adder circuit, and a NchTR $6_{j2}$ which propagates a carry signal $C_8$ being outputted from the block. There are given the inversion output signal $\overline{AP_U}$ to the gate of the NchTR $6_{j2}$, the output signal of the NOR circuit $15_{b2}$ to the gate of the NchTR $6_{h2}$, and the output signal of the NOR circuit $15_{a2}$ to the gate of the NchTR $6_{l2}$, respectively. Each carry signal is propagated to the following blocks when these signals are "1". Also the carry signal $C_4$ is directly propagated to the NchTR $6_{l3}$ of the 1-block high-order adder circuit.

The operation of the embodiment thus constructed will be described.

When all of the carry propagation signals $P_5 \sim P_8$ are not "1", namely, in the third condition, that is, when the carry signal is generated in the Manchester-carry-chain circuit 12, the inversion output signal $\overline{AP_U}$ of the NAND circuit $14_{a2}$ in the carry-look-ahead circuit 13 becomes "1", then, the NchTR $6_{j2}$ is turned on and the carry signal being generated in the Manchester-carry-chain circuit 12 is propagated as the carry signal $C_8$ being outputted from the block.

On the other hand, when all of the carry propagation signals $P_5 \sim P_8$ are "1", the inversion output signal $\overline{AP_U}$ of the NAND circuit $14_{a2}$ becomes "0". In this case, when the inversion output signal $\overline{AP_L}$ from the low-order adder circuit is "1", namely, in the first condition, the output signal of the NOR circuit $15_{b2}$ becomes "1", then, the NchTR $6_{h2}$ is turned on and the carry signal $C_4$ is directly propagated as the carry signal $C_8$. When the inversion output signal $\overline{AP_L}$ is "0", namely, in the second condition, the output signal of the NOR circuit $15_{a2}$ becomes "1", then, the NchTR $6_{l2}$ is turned on and the carry signal $C_0$ is directly propagated as the carry signal $C_8$.

Figure 9:
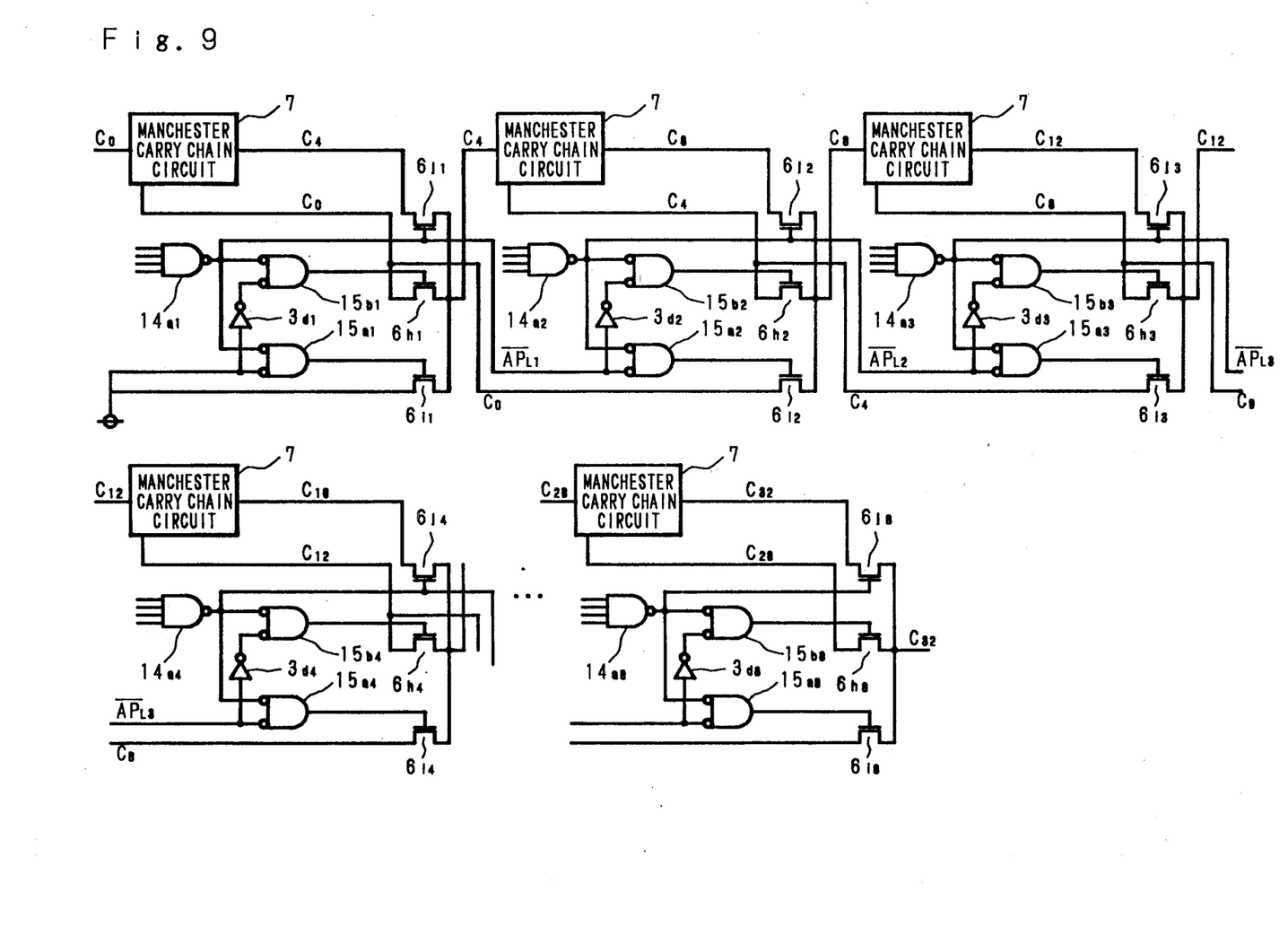
FIG. 9 is a circuit diagram showing the configuration of a 32-bit adder circuit apparatus of another embodiment.

FIG. 9 is a circuit diagram showing the configuration of a 32-bit adder circuit apparatus, in which eight 4-bit Manchester-carry-chain circuit shown in FIG. 8 are connected in series.

As same as in the aforesaid embodiment, a maximum delay path of this embodiment occurs when the carry signal $C_1$ is generated in the first block and is propagated as the carry signal $C_{32}$, and in this case, the carry propagation signals $P_2 \sim P_{32}$ become "1", then, all of the inversion output signals of the NAND circuits $14_{a2} \sim 14_{a8}$ become "0" and the NOR circuit $15_{b2}$ and the NOR circuits $15_{a3} \sim 15_{a8}$ are turned on. Also the NchTRs $6_{g2} \sim 6_{g4}$, $6_{j1}$ are turned on and the carry signal $C_1$ is propagated as the carry signal $C_4$ via the four NchTRs $6_{g2} \sim 6_{g4}$, $6_{j1}$, which signal is further propagated as the carry signal $C_8$ via the NchTR $6_{h2}$, then being propagated as the carry signals $C_{16}$, $C_{24}$, $C_{32}$ via the NchTRs $6_{i4}$, $6_{i6}$, $6_{i8}$. Accordingly, in this case, the carry signal is propagated via the 8-step NchTRs.

Figure 10:
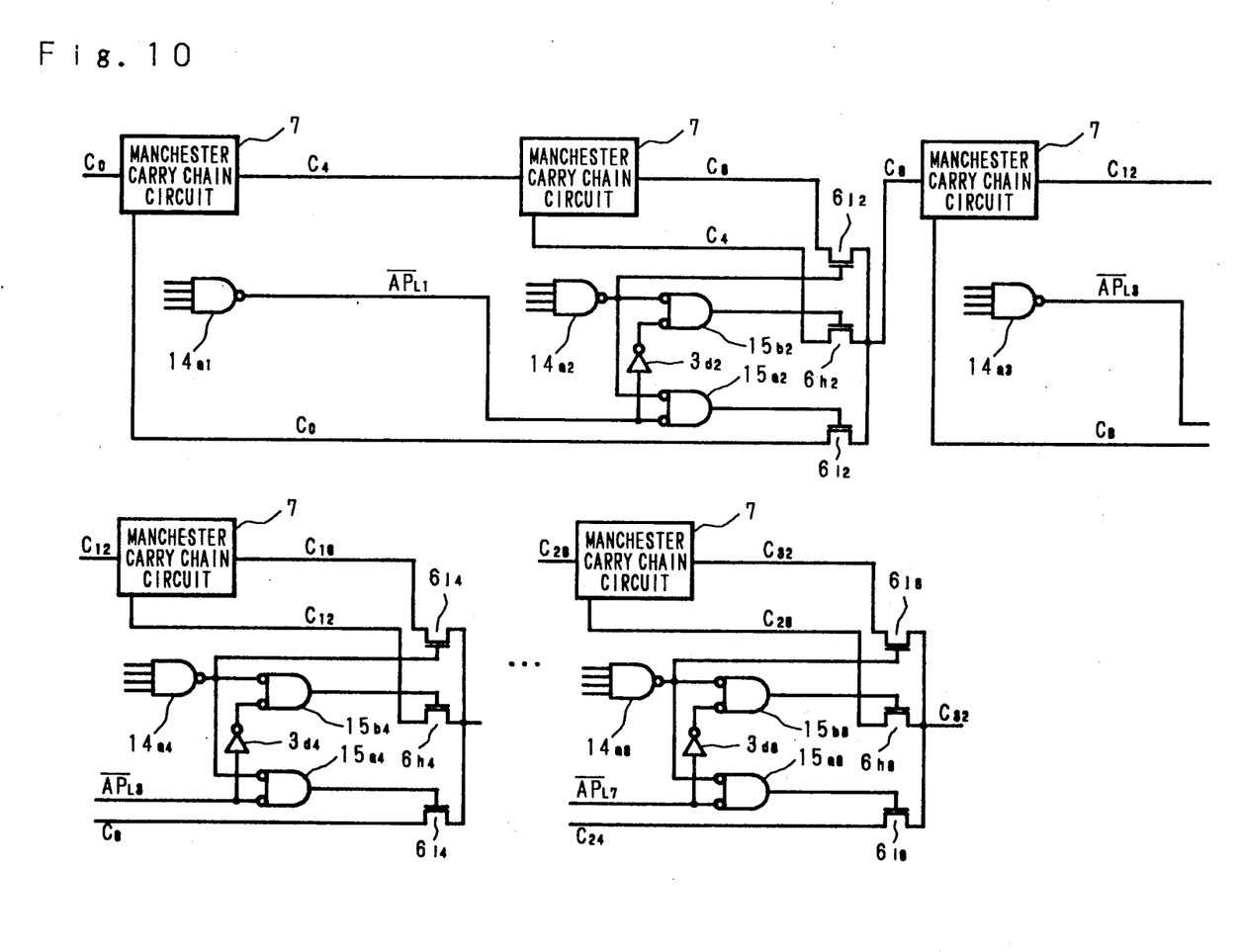
FIG. 10 is a circuit diagram showing the configuration of a modified 32-bit adder circuit apparatus of another embodiment.

FIG. 10 is a circuit diagram showing the configuration of a modified 32-bit adder circuit apparatus of this embodiment, in which the carry-lock-ahead circuit shown in FIG. 8 is provided in the Manchester-carry-chain circuits 7, 7 ... of even numbers of blocks (j=2, 4, 6, 8), as same as in FIG. 7. Then, the carry-ahead-circuit 9 of odd numbers of blocks (j=1, 3, 5, 7) consists of the NAND circuits $14_{aj}$, and the output signal $AP_U$ of the NAND circuits $14_{aj}$ in the odd numbers of blocks is given to the NAND circuit $15_{aj+1}$ and the inverter $3_{dj+1}$. The carry signal $C_{4.j}$ of the even blocks is not directly propagated to the high odd blocks. A maximum delay path of the modified another embodiment occurs when the carry signal $C_1$ is generated in the first block and is propagated as the carry signal $C_{32}$. In this case the carry signal is propagated via the 8-step NchTRs, as same as the case shown in FIG. 9.

In the two embodiments described above, there has been described about an example of the case where an adder circuit is divided into every constant digit block of four bits each, however, it will be appreciated that the present invention is not limited thereto, but may have the configuration wherein the number of digits of the block is not constant.

In the two embodiments aforementioned, the case where a positive logical carry signal is propagated has been described as an example, however, it is to be understood that the present invention is not limited thereto, but may also be applicable in a negative logical carry signal.

As described heretofore, according to the present invention, by providing means for directly outputting a carry input signal to an adjoining block in the low-order as the carry output signal of the block, in a carry-look-ahead circuit of an adder circuit comprising serial plural-digit full adders as one block, when the carry propagation signals in both of the block and the adjoining block in the low-order are true, it is adapted that only the gates of the carry-look-ahead circuits in the alternate blocks are passed when the carry signal is propagated from the low-order to high-order blocks, reducing the number of gates to be passed by the carry signal when it is propagated, thus the propagation time is shortened and a high-speed procession is made possible.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. In a multi-bit full adder including an adder block that generates carry-bit generation and propagation signals associated with each bit and that utilizes a carry-chain type circuit that responds to the carry-bit generation and propagation signals to generate and to propagate a carry-bit, with the carry-chain circuit grouped into serial n-bit subcircuits, each having an input for receiving the carry-bit propagated by the immediately preceding subcircuit and having an output for propagating a carry-bit to an immediately following subcircuit, with each subcircuit responding to the carry-bit generation and propagation signals corresponding to the respective n bits of the full adder with each subcircuit including an AP signal generating unit for generating an AP signal indicating whether a bypass condition exists where all the carry-bit propagation signals associated with the respective n bits are in the propagation state, with a given subcircuit comprising:
   a first bypass element, responsive to the AP signal generated by the given subcircuit and the carry-bit received at the input of the given subcircuit, for transferring the carry-bit received at the input of the given subcircuit to the immediately following subcircuit only when the bypass condition exists for the given subcircuit; and
   a second bypass element, responsive to the AP signals generated by the given subcircuit and the immediately preceding subcircuit and to the carry-bit received at the immediately preceding subcircuit, for transferring the carry-bit received at the immediately preceding subcircuit to the immediately following subcircuit only when the bypass conditions exist for both immediately preceding and given subcircuits.

2. In an adder circuit having a plurality of adder blocks coupled in series, with each adder block having an adder block carry bit input port coupled to an adder block carry bit output port of an adjoining lower-order adder block and having an adder block carry bit output port coupled to an adder block carry-bit input port of an adjoining higher-order block, with each adder block including a plurality of full adders, each full adder which receives a single-bit addend input signal, augend input signal, and a carry signal and includes logic elements for performing logical operations on the addend, augend, and carry input signals to generate a single-bit sum signal, associated carry-bit generation signal and carry propagation signal, with the propagation signals from the plurality of full adders included in an adder block forming a plural-bit carry propagation signal, with each adder block comprising:
   carry signal propagation means having a carry signal input coupled to the adder block carry-bit input port and having a carry-bit output coupled to the carry-bit adder block output port and coupled to receive the carry-bit generation and carry propagation signals from the plurality full adders in the adder block, for generating a single-bit carry signal in response to said associated carry generation signal, and for outputting and propagating the carry signal being generated within the carry signal propagation means as an output carry signal to be output to the adder block carry signal input port of an adjoining higher-order adder block in response to the carry propagation signals being generated by said plurality of full adders of said adder block; and carry signal selecting means, coupled to receive the carry-bit signal received at the adder block carry-bit input port and to receive a carry-bit input signal received at the adder block carry-bit input port of an adjoining lower-order adder block, said carry signal selecting means including operating means for executing the AND operation of the plural-bit carry propagation signal being generated by said plurality of full adders in said adder block to generate a first control signal being true when all bits of the plural-bit carry propagation signal are true, said carry signal selecting means for selecting the carry signal being input to said adder block carry signal input port of the adder block as the carry signal to be output to said adjoining high-order adder block to bypass the included carry signal propagation means, when the first control signal generated by said operating means is true, for selecting the carry signal being input to the adder block carry signal input port of an adjoining lower-order adder block as the carry signal to be output to said high-order adder block, when said first control signal generated by said operating means is true and a control signal, received at a control input, generated by an operating means for executing the AND operation of the plural-bit carry propagation signal being generated by the plurality of full adders in an adjoining lower-order adder block is true, and for selecting the carry signal being generated in said adder block as the carry signal to be output to said adjoining high-order adder block when the first control signal generated by the operating means for executing the AND operation of said adder block is not true.

3. An adder circuit as set forth in claim 2, wherein said carry signal propagating means comprises a precharged-type Manchester-carry-chain circuit.

4. An adder circuit as set forth in claim 3, wherein said carry signal selecting means comprises a carry-look-ahead circuit having a clocked AND gate as said operating means.

5. In an adder circuit having a plurality of adder blocks coupled in series, with each adder block having an adder block carry-bit input port coupled to an adder block carry-bit output port of an adjoining lower-order adder block and having an adder block carry-bit output port coupled to an adder block carry-bit input port of an adjoining higher-order block, with each adder block including a plurality of full adders each full adder which receives a single-bit addend input signal, augend input signal, and a carry signal and includes logic elements for performing logic operations on the addend, augend, and carry input signals to generate a single-bit sum signal, associated carry-bit generation signal and carry propagation signal, with the propagation signals from the plurality of full adders included in an adder block forming a plural-bit carry propagation signal, with each adder block comprising:

carry signal propagation means having a carry signal input coupled to the adder block carry-bit input port and having a carry-bit output coupled to the carry-bit adder block output port and coupled to receive the carry-bit generation and carry propagation signals from the plurality of full adders in the adder block, for generating a single-bit carry signal in response to each associated carry generation signal, and for outputting and propagating the carry signal being generated within the carry signal propagation means as an output carry signal to be output to the adder block carry signal input port of an adjoining higher-order adder block in response to the carry propagation signals being generated by said plurality of full adders of said adder block; and carry signal selecting means, coupled to receive the carry bit signal received at the adder block carry-bit input port and to receive a carry-bit input signal received at the adder block carry-bit input port of an adjoining lower-order adder block, said carry signal selecting means including operating means for executing the AND operation of the plural-bit carry propagation signal being generated by said plurality of full adders in said adder block to generate a first control signal being true when all bits of the plural-bit carry propagation signal are true, said carry signal selecting means for selecting the carry signal being input to said adder block carry signal input port of the adder block as the carry signal to be output to said adjoining high-order adder block to bypass the included carry signal propagation means, when the first control signal generated by said operating means is true and a control signal, received at a control input, generated by an operating means for executing the AND operation of the plural-bit carry propagation signal being generated by the plurality of full adders in an adjoining lower-order adder block is not true, for selecting the carry signal being input to the adder block carry signal input port of an adjoining lower-order adder block as the carry signal to be output to said high-order adder block, when said first control signal is true and a control signal, received at the control input, generated by the operating means of said lower-order adder block is true, and for selecting the carry signal being generated in said adder block as the carry signal to be output to said adjoining high-order adder block when the control signal generated by the operating means for executing the AND operation of said adder block is not true.

6. An adder circuit as set forth in claim 5, wherein said carry signal propagating means comprises a static-type Manchester-carry-chain circuit.

7. An adder circuit as set forth in claim 6, wherein said carry signal selecting means comprises a static-type carry-look-ahead circuit.

8. In an adder circuit having a plurality of pairs of adder blocks coupled in series, with the output of the first adder block in a pair coupled to the input of a second adder block in a pair, with each adder block having an adder block carry bit input port coupled to an adder block carry bit output port of an adjoining lower-order adder block and having an adder block carry bit output port coupled to an adder block carry-bit input port of an adjoining higher-order block, with each adder block including a plurality of full adders, each full adder which receives a single-bit addend input signal, augend input signal, and a carry signal and includes logic elements for performing logical operations on the addend, augend, and carry input signals to generate a single-bit sum signal, associated carry-bit generation signal and carry propagation signal, with the propagation signals from the plurality of full adders included in an adder block forming a plural-bit carry propagation signal, with each adder block comprising:

carry signal propagation means having a carry signal input coupled to the adder block carry-bit input port and having a carry-bit output coupled to the carry-bit adder block output port and coupled to receive the carry-bit generation and carry propagation signals from the plurality full adders in the adder block, for generating a single-bit carry signal in response to said associated carry generation signal, and for outputting and propagating the carry signal being generated within the carry signal propagation means as an output carry signal to be output to the adder block carry signal input port of an adjoining higher-order adder block in response to the carry propagation signals being generated by said plurality of full adders of said adder block; and with the second adder block in a particular pair of adder blocks having its carry input connected to receive the carry signal output by said carry signal propagation means of the first adder block in the particular pair and with said second adder block in the particular pair comprising:

carry signal selecting means, coupled to receive the carry-bit signal received at the adder block carry-bit input port of the second adder block in the particular pair and to receive a carry-bit input signal received at the adder block carry-bit input port of the first adder block of the particular pair, said carry signal selecting means including a first operating means for executing the AND operation of the plural-bit carry propagation signal being generated by said plurality of full adders in said first adder block in the particular pair to generate a first control signal being true when all bits of the plural-bit carry propagation signal are true, and including a second operating means for executing the AND operation of the plural-bit carry propagation signal being generated by said plurality of full adders in said second adder block of the particular pair to generate a second control signal being true when all bits of the plural-bit carry propagation signal are true, said carry signal selecting means for selecting the carry signal output signal generated by the carry signal propagation means of the second adder block as the carry bit output signal of said particular pair when the first and second control signals are not true, for selecting the output generated by the carry signal propagation means of said first adder block when the first control signal is not true and the second control signal is true to bypass the included carry signal propagation means of the second adder block, and for selecting the carry signal received at the carry signal input port of said first adder block as the carry bit output signal of said particular pair when the first and second control signals are true to bypass the included carry signal generation means of the first and second adder blocks.

* * * * *